(No Model.)
F. A. WEINSHANK.
SANITARY PLUMBING.
No. 452,818. Patented May 26, 1891.
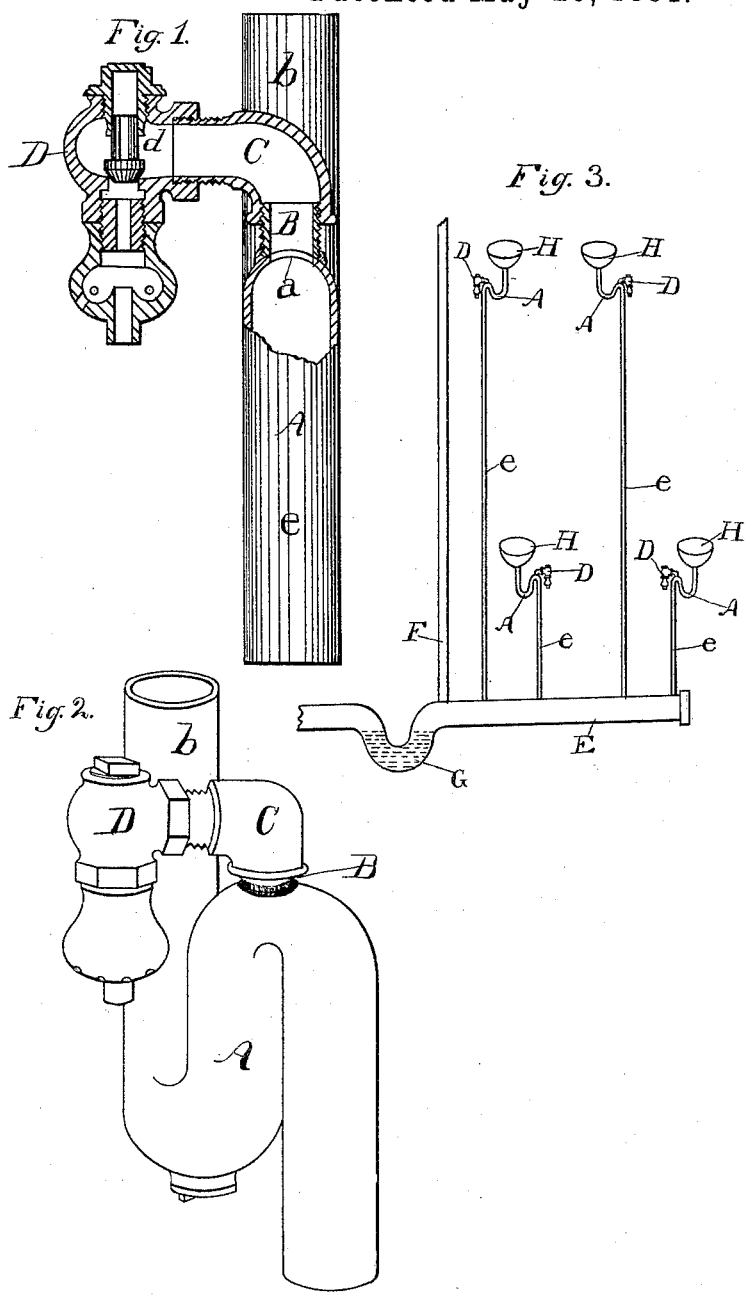
Witnesses
M. C. Galer
Alfred J. Townsend
Inventor
Frank A. Weinshank
by Hazard & Townsend

UNITED STATES PATENT OFFICE.

FRANK. A. WEINSHANK, OF LOS ANGELES, CALIFORNIA.

SANITARY PLUMBING.

SPECIFICATION forming part of Letters Patent No. 452,818, dated May 26, 1891.

Application filed June 18, 1890. Serial No. 355,885. (No model.)

*To all whom it may concern:*

Be it known that I, FRANK. A. WEINSHANK, a citizen of the United States, residing at Los Angeles, in the county of Los Angeles and State of California, have invented a certain new and useful Improvement in Sanitary Plumbing, of which the following is a specification, reference being had to the accompanying drawings.

The object of my invention is to prevent the accumulation of vitiated air in the discharge-pipes of sinks, wash-bowls, &c. To accomplish this purpose, vent-pipes leading through and extending above the roof have heretofore been applied to the top bend of the sanitary trap and the buoyancy of the vitiated air has been depended upon to cause the discharge of such air through such pipes into the open air above the roof. This means is objectionable in that the numerous vent-pipes thereby required cause considerable expense, and also such vents are liable to become inefficient by reason of their obstruction by spiders' webs, which, owing to the small diameter of the pipes and lack of force in the current passing therethrough, are liable to accumulate until the vent becomes wholly clogged. I avoid these objections by means of my improvement in sanitary plumbing herein set forth, which comprises the combination of a trapped main sewer-pipe, a trapped discharge pipe or pipes leading from the wash bowl or bowls or sinks, &c., into such sewer-pipes, an air-admitting valve communicating with the upper bend of the trap of the discharge-pipe, and a vent-opening from the sewer-pipe between its trap and the discharge-pipe.

The accompanying drawings illustrate my invention.

Figure 1 shows the anti-siphoning valved trap, partly in vertical mid-section. Fig. 2 is a perspective view of the trap. Fig. 3 shows a number of wash-bowls provided with the new trap and connected with a sewer provided with the vent, the whole illustrating my improvement and the manner in which it is applied.

A is the body of the trap, and consists of an ordinary "S-trap" having an opening $a$ in its upper bend. B is a nipple, soldered or otherwise secured to the body of the trap around such opening.

C is an elbow, screwed or otherwise secured upon the nipple and projecting beyond the side of the trap.

D is the valve-chamber, having a check-valve $d$ and communicating with the elbow and arranged to admit air from the bottom upward and prevent its backflow.

E is the sewer-pipe.

F is the vent.

G is the sewer-pipe trap.

$e$ is the discharge-pipe.

H is the wash-bowl.

The operation is as follows: While there is no water passing through the trap, the valve $d$ will remain in its seat, but immediately a stream of water is caused to flow through the trap a tendency to siphon is induced, the pressure of air downward upon the valve $d$ is partially removed, and air flows through the opening in valve D to supply the vacuum and prevent the siphoning. The air thus admitted is carried forcibly down along the discharge-pipe $e$ by the friction of the discharge water until it is finally discharged into the sewer-pipe E and into the vent-pipe F E. The accumulation of air in the sewer-pipe, caused by the discharge of air thereinto by the falling water, will produce a natural discharge of air through the vent F. By this means, it will be observed, I produce a circulation of pure air to displace any vitiated air which may accumulate in the pipes, and I also produce a positive discharge of air through the vent, thereby avoiding the possibility of non-discharge by reason of the spider-web obstruction hereinbefore referred to.

The construction of the valved trap shown enables me to apply my device in the ordinary practice of the art to the traps of sinks and wash-bowls where, by the rules of sanitary plumbing, there must be but little space between the top of the upper bend and the top of the induct member $b$. This construction consists, essentially, of an ordinary sanitary trap provided at the top of its upper bend with a check-valve arranged at one side of the trap to admit air thereinto and to prevent its backflow.

Now, having described my invention, what

I claim as new, and desire to secure by Letters Patent, is—

In sanitary plumbing, the combination of the trapped main sewer-pipe, the trapped discharge-pipe leading into such sewer-pipe, the air-admitting valve communicating with the upper bend of the trap of the discharge-pipe, and a vent-opening from the sewer-pipe between its trap and the discharge-pipe.

FRANK. A. WEINSHANK.

Witnesses:
 JAMES R. TOWNSEND,
 ALFRED I. TOWNSEND.